Sept. 2, 1958  W. M. ADEY ET AL  2,850,365
SUPPORT FOR FILAMENTS

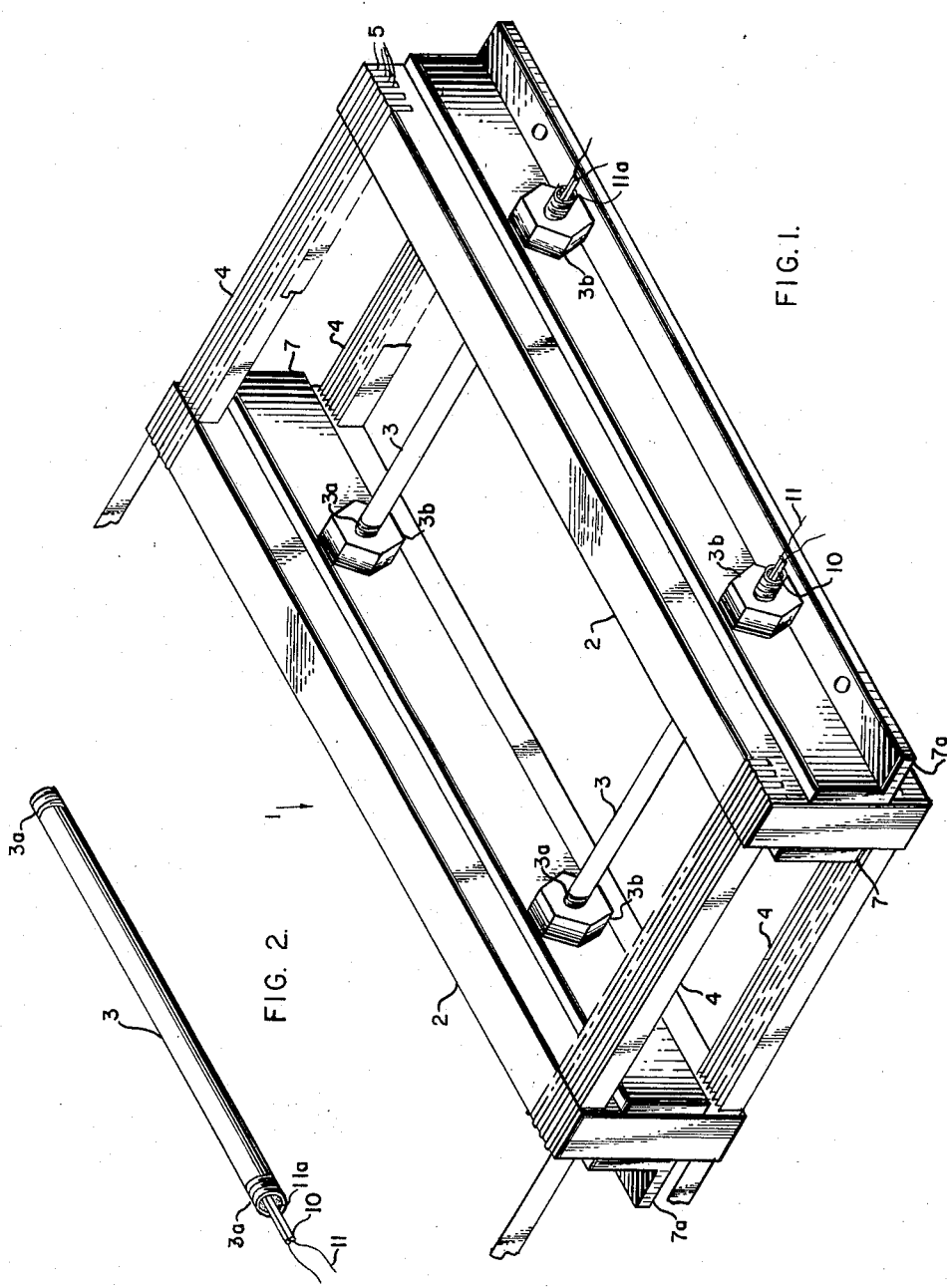

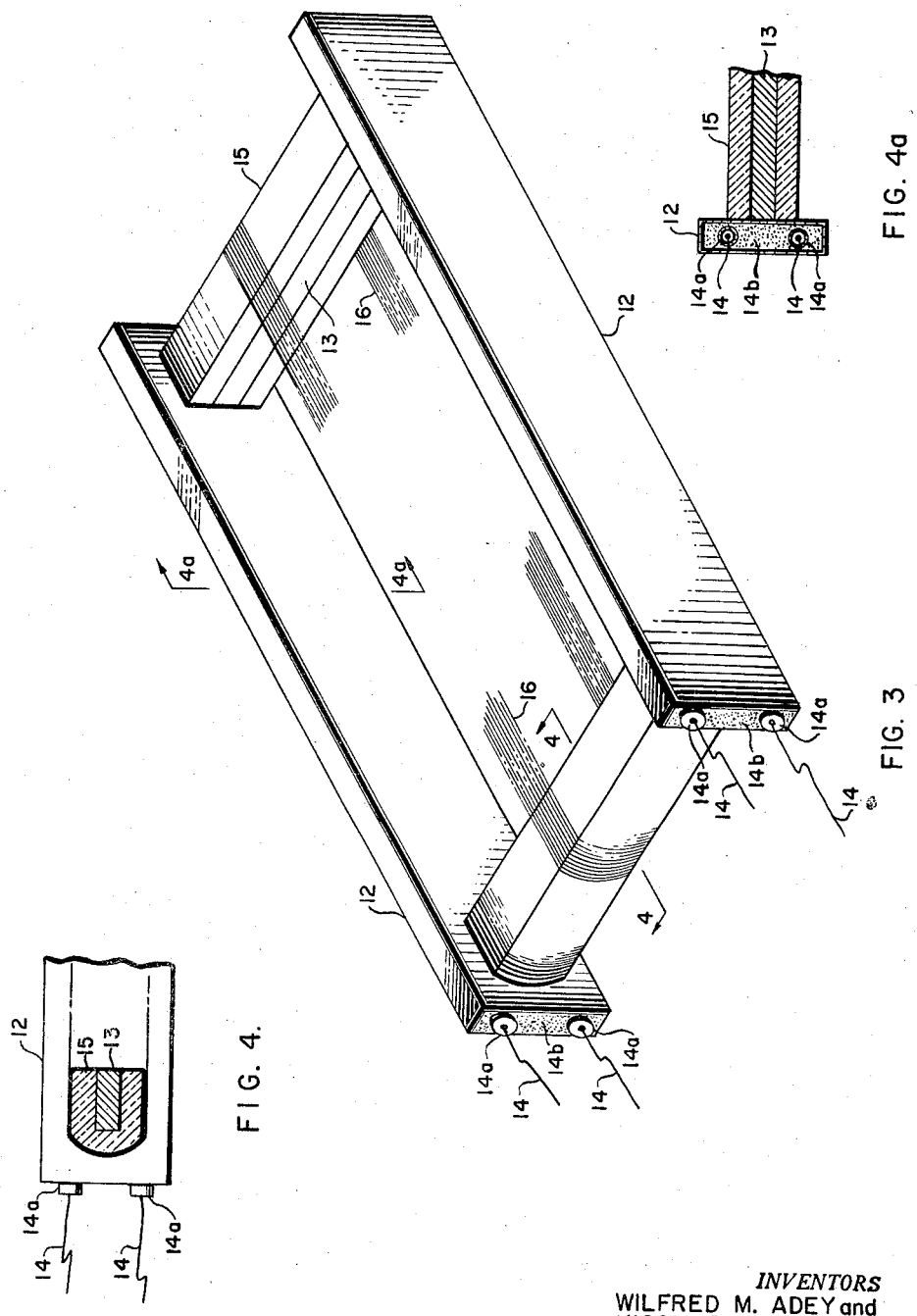

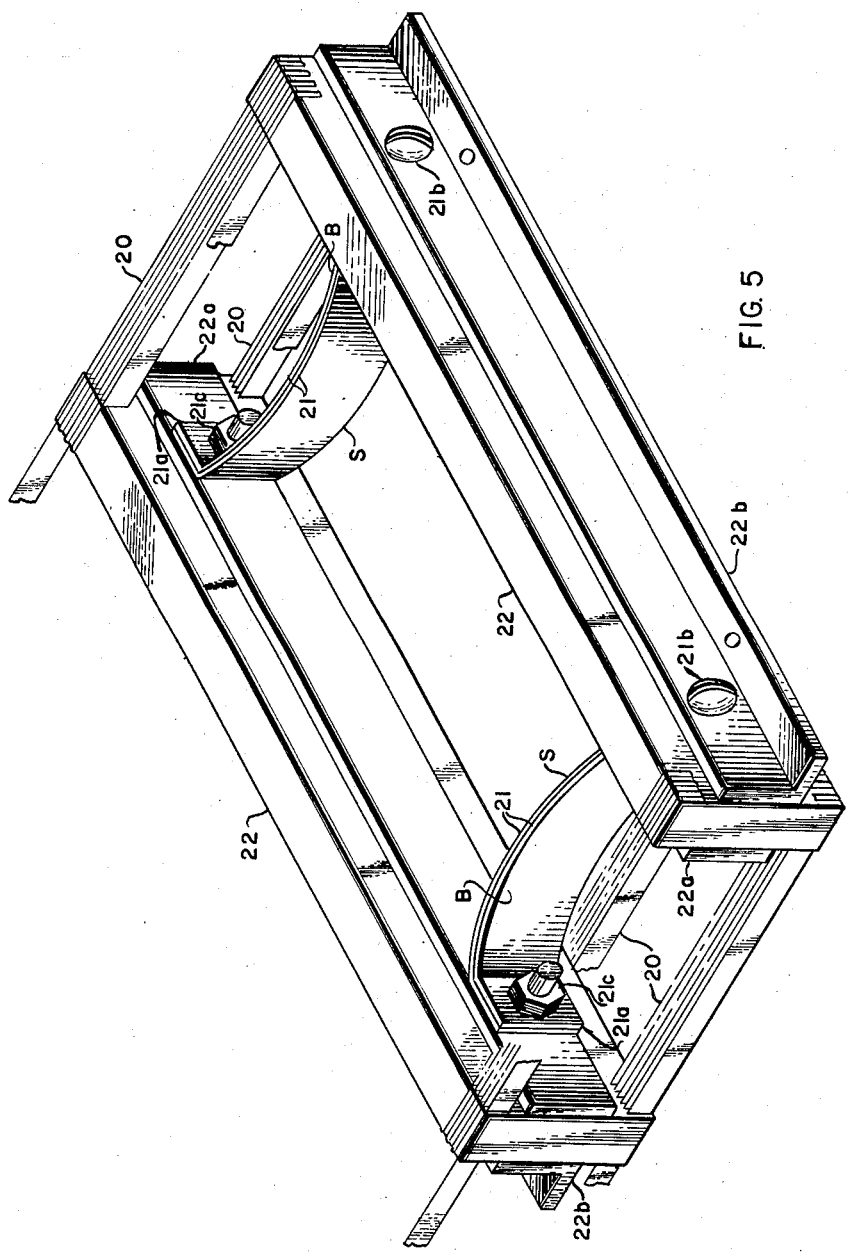

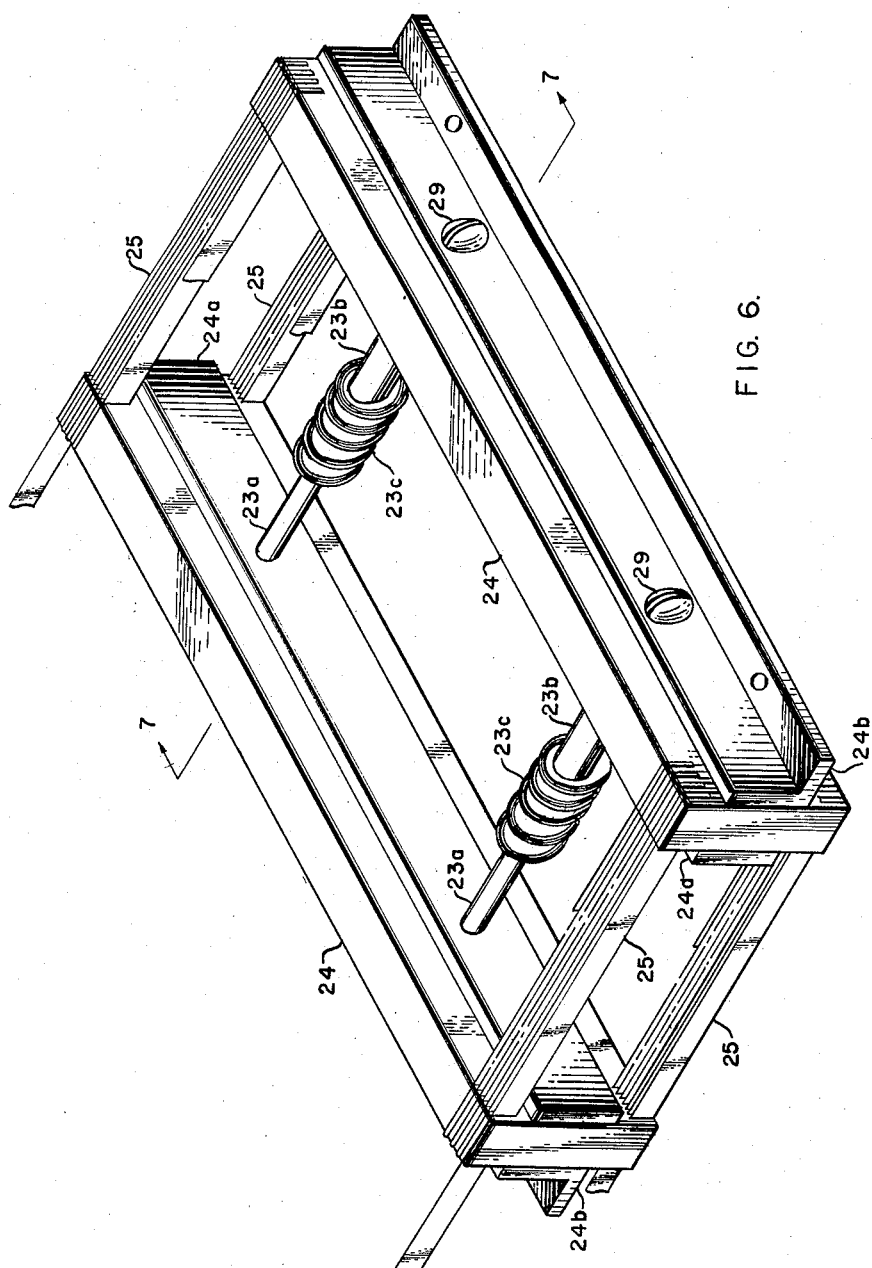

Filed May 7, 1954  5 Sheets-Sheet 5

INVENTORS
WILFRED M. ADEY and
NICOLAS M. REITZEL
BY
ATTORNEY

United States Patent Office 2,850,365
Patented Sept. 2, 1958

2,850,365

SUPPORT FOR FILAMENTS

Wilfred M. Adey, Paoli, and Nicolas M. Reitzel, Frazer, Pa., assignors to Oxy-Catalyst, Inc., a corporation of Pennsylvania Application May 7, 1954, Serial No. 428,347

2 Claims. (Cl. 23—288)

This invention relates to filament supports of a type particularly but not exclusively adapted to receive a filament coated with catalytic material.

The offensive odors and smoke contained in gases such as the gases which emanate from industrial and domestic cooking ovens, incinerators, roasters, and other such devices can very often be removed by catalytic oxidation of the offending components of the gases. Where such gases are purified by catalytic methods, it is necessary to provide in the path of the gases a suitable catalyst arranged such that an intimate and complete contact can be obtained between the gas stream and the catalyst. An advantageous method of supporting the catalyst consists of providing a filament in the form, for example, of a wire or ribbon, and coating this filament with catalytic material. Such coated filaments can conveniently be provided with relatively closely spaced strands and can be mounted in the path of the gas stream to provide the necessary intimate and complete contact of the catalyst by the gases.

Filament supported catalysts offer a number of advantages over other types of catalyst structures. In the first place, a relatively large surface area of catalyst may be disposed in a relatively small space by closely spacing relatively small sized filaments. Secondly, where the filament is composed of an electric resistance wire or ribbon, the catalytic material on its surface may be heated to its activation temperature by the passage of an electric current through the filament. As is well known, catalytic oxidation will take place only when the temperature at the surface of the catalyst is at its minimum activation temperature. Where the gases flowing over the catalyst are at a temperature above its activation temperature, they will, of course, impart their sensible heat to the catalyst, which will, as a result, be raised to its activation temperature, thus permitting catalytic oxidation of oxidizable constituents in the gas stream to take place. However, the offensive gases produced by such appliances as industrial and domestic ovens, incinerators, roasters, etc., frequently are not sufficiently hot to heat the catalyst to its activation temperature. Likewise, such gases may flow only at intermittent intervals, in which case the time required to bring the catalyst to its activation temperature, when heat transfer from the gas stream to the catalyst is depended upon, may often be so great that the catalyst will not serve its intended function. Under these circumstances, where the catalyst is disposed on a resistance wire capable of being heated by passage of an electric current, the catalyst coating may be quickly and conveniently brought to the desired temperature.

In the use of such catalytically coated filaments, difficult problems arise with reference to the expansion of the filament upon heating. As noted above, catalysis requires an intimate and complete contact between the gases and the catalyst; therefore, where a catalyst-coated filament is relied upon to effect catalytic odor elimination, it is necessary to provide a filament having a multiplicity of strands which are relatively closely and uniformly spaced in order to insure substantially complete contact between the gases and the catalyst, and hence substantially complete catalytic odor and smoke elimination. In such a structure, having closely spaced adjacent strands, provision must be made to maintain the close, uniform spacing when the filament is heated by the passage of an electrical current therethrough or the stream of hot gases flowing thereover. If such provision is not made, the strands of the filament will elongate upon heating and tend to sag, which will result in the development of gaps between adjacent wires, with resulting loss in efficiency of the catalyst. The development of such gaps presents an opportunity for a substantial portion of the gas stream to avoid any contact with the catalytic material, and thereby escape its beneficial effects. Also, in the case of an electrically-heated catalyst-coated filament elongation of the filament tends to cause short circuiting of the current which might result in burned-out filaments and/or complete deactivation of a large portion of the filament.

It is accordingly one of the objects of the present invention to provide a filament support adapted to maintain a filament in a taut condition upon heating thereof, and thereby maintain uniform spacing of the strands under varying temperatures of operation.

It is further object of the present invention to provide a filament support particularly but not exclusively adapted to receive a catalyst-coated filament and to maintain the filament in a taut condition upon heating thereof in order to insure complete and efficient use of the catalyst.

It is a further object of the present invention to provide a filament support which will maintain a filament supported thereon in a taut condition upon heating by means of thermally responsive elements associated with the support frame.

Further objects of the present invention will be apparent from the following description, and from the annexed drawings in which:

Fig. 1 is a perspective view of one of the preferred embodiments of the present invention.

Fig. 2 is a perspective view of a tie-rod of a type used in one of the preferred embodiments of the invention, and showing a heating element which is associated with the tie-rod.

Fig. 3 is a perspective view of an alternative form of the present invention.

Fig. 4 is a sectional view taken along the lines 4—4 of Fig. 3 showing details of the modification of Fig. 3.

Fig. 4A is a view taken along the lines 4A—4A of Fig. 3.

Fig. 5 is a perspective view of another alternative embodiment of the invention in which a bi-metallic element is provided for the purpose of maintaining the supported filament in a taut condition.

Fig. 6 is a perspective view of still another embodiment of the invention in which thermal expansion of a gas effects maintenance of the filament in a taut condition.

Figure 7:
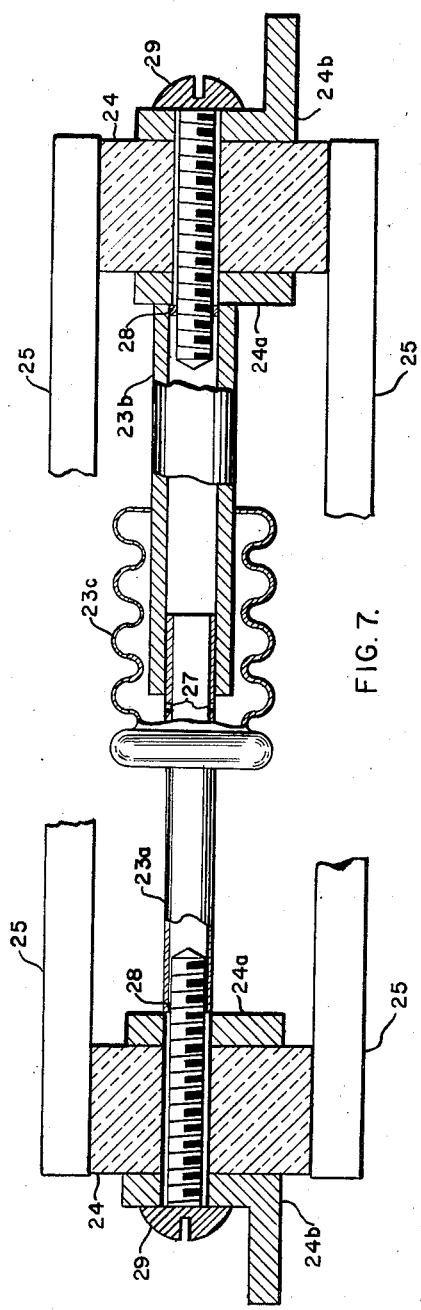
Fig. 7 is a sectional view with parts broken away taken along the line 7—7 of Fig. 6.

Stated generally, the present invention provides a filament support in which the frame of the support contains thermally responsive elements which are capable of maintaining the filament in a taut condition upon thermal actuation thereof. The maintenance of this taut condition in the filament is effected by the provision of structural elements in the support frame which elongate upon heating to a degree which matches the thermal expansion of the filament. In one modification of the present invention, thermal expansion of the elements of the filament frame compensates for the expansion of the filament itself. Thermal expansion of the frame can in some cases be effected by the generation of heat from an external source, or by the heat supplied to the filament support frame from the gas stream. In other modifications of the present invention the thermally responsive means takes the form of bi-metallic elements and expansible bellows. In all modifications of the invention, heat is motivating factor which effects the maintenance of the filament in a taut condition.

Referring first to Fig. 1, which discloses an embodiment of the present invention which is particularly adapted to support a ribbon type filament, there is shown a filament support generally indicated by the reference numeral 1, comprising dielectric filament support members 2 connected together and maintained in spaced relationship by tie-rods 3. The filament support members 2 may be of any dielectric material having suitable strength which is amenable to the forming operations necessary in the production of units of this type. Lava or porcelain, for example, are well suited as materials for this element. The support members 2 can be seen to be elongated members rectangular in cross-section, and provided with a multiplicity of slots 5 on their upper and lower longitudinal sides (as viewed in Fig. 1). These slots accommodate a ribbon filament 4 which extends sinuously over the length of the support on both the upper and lower sides (only a portion of the filament and a few of the slots being shown in the drawing in the interest of clarity). It is understood that the two layers or planes of the filament 4 may comprise either two separate ribbons or one continuous ribbon, and that the term "filament" as herein employed is intended to embrace both arrangements. It is also understood that if desired merely one layer or plane of sinuous ribbon filament may be provided, although, for reasons which will be explained below, the bi-planar filament of Fig. 1 offers particular advantages.

In the disclosed embodiment of the invention there is provided on each side of each support member 2 members 7 and 7a which may be of ordinary low carbon steel or the like for the purpose of imparting rigidity to the structure. The member 7 is provided in the form of a strap, and the member 7a in the form of an angle having a flange which enhances its stiffness. These members 7, 7a may, of course, be dispensed with if the filament supports 2 possess sufficient inherent strength, and do not require reenforcement. The tie-rod members 3 are of stainless steel, brass or other similar material which possesses a relatively high coefficient of thermal expansion, as well as sufficient strength under high temperature conditions. These tie-rods 3 are, as shown in Fig. 2 hollow, and as shown in Figs. 1 and 2, provided with external threads 3a which accommodate nuts 3b. The filament support members 2 are thus maintained in spaced relationship to each other by the tie-rods 3, which are secured to the filament support members by means of the thread and nut connection 3a, 3b. It is, of course, within the scope of the invention to provide only a single tie-rod rather than the two tie-rods shown.

The ribbon 4 of the preferred embodiment of the invention is provided with a coating of catalytic material of a type which will be described below, and the support with the ribbon thereon will, in use, be disposed in the path of a gas stream. In the embodiment of Figs. 1 and 2 the ribbon filament will be connected to a source of electrical power in order to heat the filament and its catalytic coating to the activation temperature of the catalyst. As a result of this heating of the ribbon it will attain a relatively elevated temperature in operation which will cause the ribbon to expand and elongate. Unless provision is made for taking up the slack produced by such thermal elongation, the ribbon will tend to sag, resulting in the opening of gaps between adjacent strands of the ribbon, and short circuiting of the current flowing in the ribbon. As can be seen from Fig. 1, adjacent strands of the ribbon are relatively closely spaced, for example 1/16", in order to provide sufficient and complete contact between the gas stream and the coated ribbon. Expansion of the ribbon with resultant sagging and the opening of gaps would, of course, be disadvantageous in catalytic oxidation reactions, because of the fact that such expansion would permit a substantial portion of the gases to by-pass the ribbon by flowing through the gaps. To avoid this according to the present invention, the tie-rods 3 of the modification of Fig. 1 are constructed in such manner as to thermally elongate and contract in phase with the thermal elongation and contraction of the strands of the ribbon filament 4. Since the filament support members 2 are secured to the tie-rods at each end thereof, the thermal elongation and contraction of the tie-rods will displace the support members away from and towards each other respectively. This displacement of the support members will take up the slack produced by the thermal elongation of the filament strands, and maintain them in their original closely spaced relationship.

In the modification of Fig. 1 the heat required to effect elongation of the tie-rods 3 is supplied thereto by means of electric resistance heating units 10, 11. These heating units comprise a double porcelain tube 10 through which the resistance wire continuously extends in a U-shaped path. The heating units 10, 11 are packed within a refractory material 11a such as magnesia, and extend within the tie-rods 3 for substantially the full length thereof. The resistance wires 11 are, of course, connected to a source of electric power, either in series or in parallel, and may be incorporated into the circuit of the filament 4.

In an operating cycle of the embodiment of Fig. 1, upon commencement of flow of oxidizable gases power is supplied to the ribbon filament 4 and to the resistance wires 11. The filament 4, because of its relatively low heat capacity, is heated to the desired temperature of activation of the catalyst (usually no more than 800° F.) within a relatively short time. The tie-rods are, of course, heated at the same time by the wires 11 and thermal expansion of the filament strands is therefore accompanied by thermal elongation of the tie-rods and concomitant movement of the filament support members 2 away from each other. As a result the filament strands are maintained in their original closely spaced relationship, and the oxidizable components of the gas stream are substantially eliminated by the catalyst. After the gas flow ceases and the flow of electrical current through the ribbon 4 and wires 11 is terminated, the ribbon strands and the tie-rods contract to their original length.

The successful operation of the device provided by the invention depends upon a correlation of the thermal expansion and contraction of the filament with the thermal elongation and contraction of the tie-rods. That is, upon heating or cooling of the filament with accompanying elongation and contraction thereof, the tie-rod must elongate and contract at approximately the same rate. If the filaments elongate more rapidly than the tie-rods upon heating, non-uniform spacing of the filaments will result with accompanying short-circuiting where the filament is electrically heated. Where the filaments contract more rapidly than the tie-rods upon cooling, stresses will develop which may result in fracture of the filaments. Likewise, the total increase in length of the filaments and tie-rods should be approximately equal when terminal operating temperatures are reached.

In the embodiment shown in Fig. 1 and described above, the expansion and contraction of the ribbon filament and the tie-rods can be correlated by properly adjusting the rate of heating brought about by passage of current through the filaments and heating elements 10, 11. Generally speaking, the mass of the individual filament strands will normally be appreciably lower than that of the tie-rods and accordingly a tendency will exist for the tie-rods to heat and cool more slowly than the filaments. To prevent this from occurring, or to minimize this tendency, the tie-rods should preferably have a mass which is the minimum required for adequate strength. The construction shown in Fig. 1 for the tie-rods, namely a hollow tube, is advantageous in this respect, since it provides good strength with a minimum of mass.

To further insure the proper correlation between the thermal expansion and contraction of the tie-rods and filaments, the tie-rods should be constructed of a material having a coefficient of expansion at least as great as and preferably greater than that of the filament material. Where the tie-rods are made of a material having a higher coefficient of expansion than the filament material, they respond at a relatively faster rate to temperature changes, which tends to compensate for their greater mass. Furthermore, in such case the tie-rods may assume a lower terminal temperature relative to the filaments and still provide an equivalent terminal elongation.

A suitable filament comprises, for example, an 80 Ni–20 Cr ribbon. This material is suitable for a catalytic coating and possesses a sufficiently high electrical resistivity to be readily and economically heated by the passage of an electrical current. This material (80 Ni–20 Cr) has a coefficient of thermal expansion of $17.6 \times 10^{-6}$ per deg. C. Suitable tie-rod materials which can be used with an 80 Ni–20 Cr ribbon comprise, for example, an 80 Cu–20 Zn brass which has a coefficient of thermal expansion of $19.1 \times 10^{-6}$ per deg. C., or stainless steel AISI type 302 B (18% Cr, 9% Ni, 2.5% Si, 2% Mn, 0.08–0.20% C, balance iron with minor amounts of impurities) which has a coefficient of thermal expansion of about $18 \times 10^{-6}$ per deg. C. Where such a combination of materials are used, the temperature rise required to effect a given elongation in the tie-rods is less than the temperature rise required in the ribbon to effect the same elongation in the ribbon. As a result, it is apparent that although the tie-rods may heat and cool more slowly because of their greater mass, this sluggishness is offset by their relatively higher coefficient of expansion. It is likewise apparent that the terminal operating temperature of the brass tie-rods may be less than that of the filaments and still provide equivalent elongation. A lower terminal operating temperature for the tie-rod is desirable since the power required to heat the tie-rod is thus minimized and in addition the tendency toward weakening of the tie-rods because of overheating is likewise minimized.

In the embodiment of Fig. 1 the selection of the proper materials for the filament and tie-rods having the proper coefficients of expansion, and the selection of the proper amount of current to supply the necessary heat for the tie-rods and filaments can be determined empirically for any given set of conditions, such choice being well within the skill of the art.

The embodiment of Fig. 1 can be modified by the omission of the heating units 10, 11 for the tie-rods. Where these heating units are omitted, the general considerations discussed above as regards the relative thermal expansion coefficients of the tie-rods and ribbon and the relative masses of the filaments and the tie-rods apply. Where the heating means 10, 11 for the tie-rods is omitted, the tie-rods are heated by radiation and convection from the ribbon 4 and by the gas stream flowing through the filament. Under these circumstances the coefficient of thermal expansion of the tie-rods should be greater than that of the ribbon in order to prevent sagging of the ribbon strands on heating and the imposition of stresses upon cooling, and because of the tendency of the tie-rods to remain at a lower temperature than the filaments. Where the tie-rods are heated only by radiation or convection, the bi-planar filament of Fig. 1 (as compared to a similar structure having a filament disposed entirely in a single plane) offers particular advantages in that the radiant effect of the two planes of the filament impart a greater amount of heat to the tie-rods than would a single plane filament. Furthermose, the two plane filament with the tie-rods therebetween shields the tie-rods and protects them from temperature variations.

As previously noted, under some circumstances it will prove feasible to dispense with heating the filament 4 by the passage of an electric current therethrough, particularly where the gas stream being purified by the catalyst is at a relatively high temperature and/or contains a relatively high concentration of oxidizable matter. Where the filament need not be heated, the principles of the invention are applicable, and, again, the general considerations of relative thermal expansion coefficients and relative masses of the tie-rods and filaments as hereinabove discussed apply. Under these circumstances the filament is heated by the sensible heat of the gas stream and by the heat of reaction released upon oxidation of the combustible components of the gases. Heat from the gases and the filament 4 will be imparted to the tie-rods 3 by radiation and convection, which will, in turn, elongate to move the support members 2 away from each other and maintain the ribbon in a taut condition. The tie-rods 3 should have a relatively high coefficient of thermal expansion as compared to the ribbon, and should be of a relatively low heat capacity in order that they might quickly respond to temperature changes.

While tubular tie-rods are disclosed in the embodiment of the invention shown in Fig. 1, it is understood that the invention is not limited to tie-rods of this particular shape. The use of hollow tubes as tie-rods is convenient in that such tubes have a relatively low mass and heat capacity, and the parts may be held in assembled relationship by the nuts 3; also the heating means 10, 11 may readily be provided in the interior of the hollow tie-rods. However, tie-rods in the form of channel sections or other structural shapes might be substituted for tubular tie-rods, particularly where the heating means 10, 11 is not required to effect thermal elongation of the tie-rods.

Figs. 3, 4 and 4A show a modification adapted to support a wire-type filament rather than ribbon filament. In this modification the expansible and contractible tie-rods take the form of hollow members 12 adapted to elongate and contract under the influence of heat supplied by resistance wires 14. The resistance wires are accommodated by porcelain tubes 14a packed in a refractory material 14b within the hollow members 12. In this modification the resistance wire 14 for each tie-rod extends into one of the porcelain tubes 14a, and is led out of the second tube. The portion of the wire contained within the members 12 thus follows a U-shaped path. The wire filament 16 is wound over an insulating sleeve 15 which fits over supporting members 13 of steel or the like. These supporting members 13 are secured at each end thereof to the opposed faces of the tie-rods 12. It is understood that the filament 16 extends continuously over the space between the tie-rods 12, and that only a portion of this filament is shown in the interest of clarity.

In the operation of the modification of Figs. 3, 4 and 4A, thermal elongation and contraction of the members 12 maintains the strands of the filament 16 taut by increasing and decreasing the distance betwen the two filament supporting members 13 in phase with the elongation and contraction of the filaments. As with the modification of Fig. 1, the two resistance wires 14 may be connected in a single circuit in order to insure and equal input of heat to both members 12, and an equal expansion and contraction of both of these members. As in the previously described embodiments, members 12 should have a relatively low heat capacity and a relatively high coefficient of thermal expansion, preferably as high as or somewhat higher than the coefficient of thermal expansion of the filament wires.

In Fig. 5 there is shown an embodiment of the invention in which a bi-planar ribon filament 20 is maintained in a taut condition by the behavior of bi-metallic tie-rods 21. In this embodiment, as with the embodiment of Fig. 1, the bi-planar filament is supported in dielectric slotted support members 22 which are maintained in spaced relationship to each other by the tie-rods. Re-enforcing members 22a, 22b are provided on each side of support members 22, the inside member being in the form of a strap 22a and the outside member in the form of an angle 22b. As shown in the drawing, the ends of the bi-metallic tie-rods 21 are bent to provide ears 21a. These ears are perforated in order to accommodate fasteners such as the disclosed bolts 21b which extend through the ears and through aligned openings in the members 22a, 22b, and support members 22. Nuts 21c maintain the parts in assembled relationship. The tie-rods 21 are curvilinear when cold, as shown in the drawing, and tend to become relatively straight upon heating. As a result the effective length of the tie-rods (i. e. the length of the chord connecting the ends of each tie-rod) increases, which has the effect of increasing the spacing between the support members and thereby compensating for the thermal expansion of the filament 20. With this modification, the heat necessary to effect straightening of the tie-rods 21 is supplied by the sensible heat of the gas stream flowing over them and by heat radiated to them by the two layers of hot filament when the filament is electrically heated. Since the tie-rods 21 will normally remain at a lower temperature than the filaments, they should be adapted to increase or decrease in effective length under the influence of a given temperature change by an amount greater than the thermal expansion or contraction of the filament strands under the influence of the same temperature change. As explained above, if the tie-rods behave in this manner, the ribbon filament will not sag during heating, nor will it be stressed during cooling. The proper thermal behavior of the tie-rods can be realized by properly selecting the materials comprising the bi-metallic tie-rods.

The bi-metallic tie-rods of the modification of Fig. 5 may take the form, for example, of a conventional steel-brass bi-metal element composed of a strip of steel and a strip of brass welded or riveted together. With such an element, the brass strip, having a relatively high thermal expansion coefficient, would constitute the strip indicated by the letter B, and the steel would constitute the strip indicated by the letter S. A bi-metallic tie-rod composed of these metals arranged as shown will tend to become straight upon heating because of the relatively high coefficient of thermal expansion of brass as compared to steel. Other combinations of metals may, of course, be used provided the proper relationship of thermal expansion coefficients is maintained.

In Figs. 6 and 7 there is disclosed a further modification of the present invention in which each of the tie-rods is provided in the form of two telescoping rods 23a and 23b. The rods are secured at each end to filament support members 24 which are provided with reenforcing members 24a, 24b. As more clearly shown in Fig. 7, a suitable bushing 28 having a centrally located threaded aperture is secured in the end of each hollow rod 23a, 23b. The members 24a, the angles 24b, and the support members 24 are provided with aligned apertures through which a machine screw 29 extends. The screws 29 are threadedly received by the members 28 in such manner that the supports 24, straps 24a, angles 24b, and the hollow rods 23a, 23b are maintained in assembled relationship. As also shown in Fig. 7 the telescoping rods 23a, 23b and the joint between the rods is covered by expansible bellows 23c of suitable heat resistant material such as brass. Ports 27 in rod 23a permit communication between the interior of the hollow rods and the space enclosed by the bellows. A filament 25 is supported, as with the modification of Figs. 1 and 5, in slots provided in the dielectric support members 24.

In the use of the modification of Figs. 6 and 7 of the invention, an increase in the temperature causes expansion of the fluid (which may be air) contained within the hollow rods and bellows which effects telescoping movement of the rod sections 23a, 23b. The movement of the rod sections 23a, 23b relative to each other increases the spacing between the filament support members and thereby maintains the filament in a taut condition as the filament expands and elongates upon heating. Upon cooling of the filament and the fluid contained within the hollow tie-rods, the spacing between the filament support members is decreased as the rod sections telescope into each other. The construction of this modification must, of course, be such that substantially pressure-tight seals such as those of Fig. 7 are provided between the rod sections 23a, 23b and their respective filament supports 24, and between the bellows 26 and the rod sections.

Figure 8:
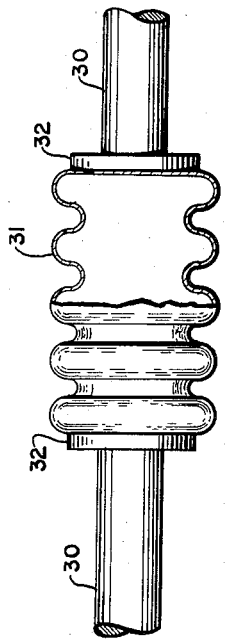
Fig. 8 is a fragmentary view of a modification somewhat similar to the modification of Fig. 7 in which thermal expansion of a gas effects maintenance of the filament in a taut condition.

Fig. 8 discloses a modification somewhat similar to Fig. 7 in which solid tie-rods 30 are connected by means of an expansible bellows 31. The ends of the bellows are secured to discs 32 provided on the opposed ends of the rods so that heating by the gas stream of the fluid in the bellows will cause expansion thereof. As with the modification of Figs. 1, 5 and 6, filament support members mounted on the outer ends of these rods 30 are moved away from each other to maintain a supported filament in a taut condition.

Another possible embodiment involving the thermal expansion of a gas consists of a simple piston-cylinder arrangement. With such a modification the piston and cylinder can be provided between the filament support members and adapted, upon heating and cooling of the gas in the cylinder, to displace the piston and thereby effect displacement of the filament support members to maintain the filament in a taut condition.

In the embodiments of Figs. 6, 7 and 8, and the described piston-cylinder embodiment, the fluid is adapted to respond to a change in temperature by moving the filament support members away from and towards each other by an amount equal to or slightly greater than the thermal elongation and contraction of the ribbon filament. As explained above, this will preclude the possibility of the development of gaps in the filament upon heating and undue stressing of the filament upon coating. It should be noted that the fluid may, if desired, be placed under an initial pressure at room temperature. If this is done, the strands of the filament will at all times be under some tensile stress. This arrangement would offer advantages in that the fluid would not necessarily have to be heated to effect movement of the filament support members toward and away from each other. Such movement would take place upon elongation or contraction of the filament by virtue of the pressure of the fluid on the bellows.

The filament employed with the present invention can be coated with any suitable catalytic material, and it is not intended that the present invention is limited to a particular catalyst, or filaments of a particular size or cross-sectional shape. It should, however, be stated that satisfactory results can be obtained by coating the filament with a catalytic form of an inorganic oxide or a mixture of such oxides, and subsequently impregnating this coating with a suitable metal such as platinum. Such catalysts may be of the type described in the copending application of Eugene J. Houdry and W. M. Adey, Serial Number 366,057, filed July 3, 1953, now abandoned, for Catalytic Structure, namely, mixtures of alumina with beryllia or alumina with zirconia, impregnated with platinum or other metal. Coatings of this type provide films of superior hardness and adherence on smooth, nonporous surfaces such as the filament of the present invention. The film of catalytically active oxide provides an excellent base or carrier for finely divided catalytically active metals to produce catalytic structures of outstanding properties. Despite the extreme thinness of the catalytic film, catalysts of excellent activity may be provided. In particular, oxidation catalysts of superior flexibility, activity and durability may be produced by impregnating a film of catalytic oxide composed chiefly of alumina, beryllia, thoria, magnesia, zirconia or mixtures thereof, with finely divided metal such as platinum, ruthenium, palladium, silver, copper, chromium, cobalt and nickel, or combinations of these metals. Particularly excellent results are obtained with the use of platinum.

Using such a film composed chiefly of catalytically active oxides, care should be taken to employ a filament composed of a material which will not detrimentally effect the catalytic activity of the oxide. In some cases, for example, iron-containing or copper-containing alloys have a tendency to poison the film of catalytic oxide, destroying its catalytic activity. Determination of the suitability of the material to receive the catalytic film can be easily determined by preparing a sample and checking its activity under operation conditions.

Using catalytic coating of this type, the thickness of the catalytic film is of great importance. Essentially, the film of catalytic oxide should be very thin, and should not in any case exceed a thickness of about .015". Films of greater thickness than this have a strong tendency to crack and flake off the support. Preferably, the film is considerably thinner than .015", and in general, for best results, should have a thickness of no greater than about .0015".

One method of applying the catalytic oxide coating consists of the steps of flowing or spraying a slurry containing, for example, beryllia, alumina and aluminum nitrate over the exposed filament wires. Excess slurry can be removed by an air blast or by vigorous shaking and the remaining film heated by passing an electric current through the filament. Heating of this film causes evaporation of the moisture and decomposition of the aluminum nitrate to produce a hard superficial coating of mixed alumina and beryllia. A film of optimum thickness can be attained by repeating the flowing or spraying, shaking and drying steps outlined above. The oxide film can then be impregnated with platinum by flowing a solution of chloroplatinic acid ($H_2PtCl_6 \cdot 6H_2O$) containing about 1% platinum thereover. A subsequent and final heating will have the effect of decomposing the platinum salt and producing metallic platinum.

While we have disclosed preferred embodiments of our invention, we contemplate that various changes might be made thereto which fall within the scope of the invention.

We claim:

1. A catalytic unit comprising a filament providing a catalytic surface, and a support for said filament, said unit comprising a pair of rigid, spaced-apart filament supporting members, a plurality of closely spaced strands of slender catalytic filament extending between said supporting members such that each strand is supported at either end by said supporting members, rigid connecting members connecting said supporting members to one another in spaced-apart relationship, the length of said connecting members at ambient temperatures being such as to maintain said filament strands in a taut condition between said supporting members, said connecting members being of hollow construction and being provided internally with electric resistance elements adapted to be heated by an electric current so as thereby selectively to heat said members and cause longitudinal thermal expansion thereof when said catalytic filament is heated thereby increasing the distance between said supporting members and maintaining said filament strands in taut condition when heated.

2. A catalytic unit comprising a filament providing a catalytic surface, and a support for said filament, said unit comprising a pair of rigid, spaced-apart filament supporting means, a plurality of closely spaced strands of slender catalytic filament extending between said supporting members such that each strand is supported at either end by said supporting members, said filament strands being arranged in two spaced apart layers, said strands of catalytic filament being comprised of an electric resistance filament provided with a coating of a catalytic material, said filament being adapted to be heated by an electric current, rigid connecting members connecting said supporting members to one another in spaced apart relationship, the length of said connecting members at ambient temperatures being such as to maintain said filament strands in a taut condition between said supporting members, said connecting members being provided with electrical heating means adapted selectively to heat said members and cause longitudinal thermal expansion thereof when said catalytic filament is heated thereby increasing the distance between said supporting members and maintaining said filament strands in taut condition when heated, said connecting members being arranged between said spaced apart layers of filament strands and adapted to receive radiation therefrom when said strands are electrically heated thereby increasing the rate at which said connecting members are heated and correspondingly increasing the rate of thermal expansion thereof.

References Cited in the file of this patent

UNITED STATES PATENTS

| | | |
|---|---|---|
| 2,156,422 | Baader | May 2, 1939 |
| 2,658,742 | Suter et al. | Nov. 10, 1953 |